(12) United States Patent
Sirito-Olivier et al.

(10) Patent No.: US 10,492,281 B2
(45) Date of Patent: *Nov. 26, 2019

(54) SELECTIVE POWER SUPPLY DEVICE FOR INCANDESCENT LAMP OR LIGHT-EMITTING DIODE

(71) Applicants: STMicroelectronics (Alps) SAS, Grenoble (FR); STMicroelectronics Application GmbH, Aschheim-Dornach (DE); STMicroelectronics S.r.l., Agrate Brianza (MB) (IT)

(72) Inventors: Philippe Sirito-Olivier, St. Egreve (FR); Giovanni Luca Torrisi, Aci Catena (IT); Manuel Gaertner, Feldkirchen (DE); Fritz Burkhardt, Munich (DE)

(73) Assignees: STMicroelectronics (Alps) SAS, Grenoble (FR); STMicroelectronics Application GmbH, Aschheim-Dornach (DE); STMicroelectronics S.r.l., Agrate Brianza (MB) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,615

(22) Filed: Feb. 26, 2019

(65) Prior Publication Data

US 2019/0191536 A1 Jun. 20, 2019

Related U.S. Application Data

(63) Continuation of application No. 15/957,578, filed on Apr. 19, 2018, now Pat. No. 10,257,917.

(30) Foreign Application Priority Data

Apr. 24, 2017 (FR) ...................... 17 53529

(51) Int. Cl.
*H05B 39/02* (2006.01)
*B60Q 3/80* (2017.01)
(Continued)

(52) U.S. Cl.
CPC ............... *H05B 39/02* (2013.01); *B60Q 1/00* (2013.01); *B60Q 3/80* (2017.02); *H05B 33/0806* (2013.01);
(Continued)

(58) Field of Classification Search
CPC ...... H05B 39/02; H05B 33/0815; B60Q 3/80; B60Q 3/82; B60Q 3/85
See application file for complete search history.

(56) References Cited

U.S. PATENT DOCUMENTS 5,304,896 A * 4/1994 Asada .................. B60Q 3/80
307/10.8
6,580,219 B1 * 6/2003 Jones, III ........... H05B 37/0281
315/80

(Continued)

OTHER PUBLICATIONS

INPI Search Report and Written Opinion for FR 1753529 dated Oct. 23, 2017 (6 pages).

*Primary Examiner* — Jason Crawford
(74) *Attorney, Agent, or Firm* — Crowe & Dunlevy (57) ABSTRACT

The power supply device comprises a supply transistor commanded by a command signal and providing electric power to a lighting module, and a driving means configured to selectively generate, depending on an instruction signal representative of the structure of said at least one lighting module, a first command signal able to command the supply transistor into an ohmic regime, a second command signal able to command the supply transistor into a pulse width modulation regime involving an alternation of ohmic regimes and blocked regimes, and a third command signal (Continued)

able to command the supply transistor into a saturated regime.

16 Claims, 6 Drawing Sheets

(51) Int. Cl.
    *H05B 33/08*     (2006.01)
    *H05B 39/04*     (2006.01)
    *B60Q 1/00*     (2006.01)

(52) U.S. Cl.
    CPC ....... *H05B 33/0815* (2013.01); *H05B 39/047* (2013.01)

(56) References Cited

U.S. PATENT DOCUMENTS

| | | | | |
|---|---|---|---|---|
| 7,126,290 | B2 * | 10/2006 | Elliott | H05B 33/0818 315/312 |
| 10,129,939 | B1 * | 11/2018 | Zhang | H05B 33/0812 |
| 10,257,917 | B2 * | 4/2019 | Sirito-Olivier | B60Q 1/00 |
| 2002/0195948 | A1 | 12/2002 | Kover, Jr. et al. | |
| 2003/0222587 | A1 * | 12/2003 | Dowling, Jr. | G06Q 30/0201 315/149 |
| 2007/0194905 | A1 | 8/2007 | Herrig et al. | |
| 2008/0192499 | A1 * | 8/2008 | Gardner | B60Q 3/85 362/488 |
| 2008/0304274 | A1 * | 12/2008 | King | B60Q 1/0088 362/487 |
| 2009/0262548 | A1 * | 10/2009 | Ando | B60Q 3/82 362/544 |
| 2010/0026377 | A1 * | 2/2010 | Weder | G05F 1/561 327/538 |
| 2011/0080112 | A1 * | 4/2011 | Shearer | H05B 33/0815 315/291 |
| 2012/0181944 | A1 * | 7/2012 | Jacobs | H05B 33/0815 315/224 |
| 2016/0066372 | A1 | 3/2016 | Lombardi et al. | |
| 2017/0118816 | A1 * | 4/2017 | Ohashi | H05B 33/0827 |
| 2017/0126116 | A1 * | 5/2017 | George | H03K 17/56 |
| 2017/0215240 | A1 * | 7/2017 | Sawada | H05B 33/0815 |
| 2019/0098711 | A1 * | 3/2019 | Li | H05B 33/0815 |
| 2019/0098717 | A1 * | 3/2019 | Fukuda | H05B 33/0851 |

* cited by examiner

SELECTIVE POWER SUPPLY DEVICE FOR INCANDESCENT LAMP OR LIGHT-EMITTING DIODE

CROSS-REFERENCE TO RELATED APPLICATIONS

This application is a continuation of U.S. application patent Ser. No. 15/957,578 filed Apr. 19, 2018, which claims the priority benefit of French Application for Patent No. 1753529, filed on Apr. 24, 2017, the disclosures of which are hereby incorporated by reference in their entireties to the maximum extent allowable by law.

TECHNICAL FIELD

Embodiments of the present invention relate to the power supply of a lighting system, such as a lighting system including incandescent lamp modules and/or light-emitting diode modules.

BACKGROUND

The use of light-emitting diodes (LEDs) in lighting is becoming increasingly common, in particular because it is possible to create arrays of diodes that are capable of providing a powerful light with a high efficiency. LED lighting devices are therefore finding an increasing number of applications, such as in the automotive sector, for producing parking lights and headlights, or indeed in the production of lighting for passenger compartments, such as status lights or comfort lights.

Nonetheless, incandescent lamp lighting devices still play an important role, in particular in the automotive sector.

As a result, in particular in the automotive sector, incandescent lamps and LED lights sometimes have to be supplied with power by one and the same power supply device.

Now, these two kinds of structures have different and sometimes incompatible restrictions.

Figure 1A:
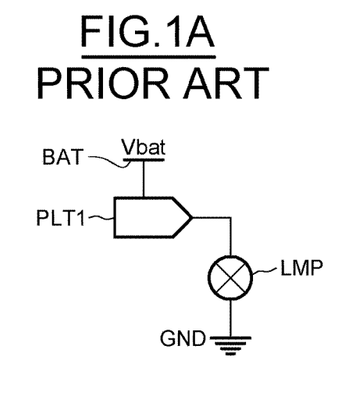
FIGS. 1A, 1B, 2A, and 2B, described previously, show existing systems.

FIG. 1A shows one common solution for supplying power to an incandescent lamp, in which a power supply module PLT1 makes it possible to couple the lamp LMP to a supply voltage source Vbat (this kind of power supply module, connected between a supply voltage and the load, is commonly referred to as a high-side driver).

However, incandescent lamps draw high inrush currents at the instant when they are activated, whereas power consumption is relatively modest during normal operation.

Figure 1B:
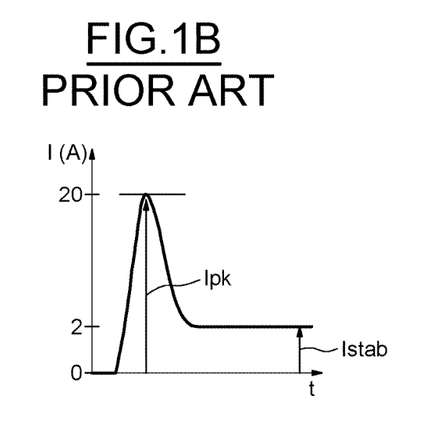

FIG. 1B shows the current, upon switching on an incandescent lamp, that a power supply module, for example a high-side driver, needs to provide in order to supply such an incandescent lamp with power. On account of an impedance that varies with temperature, the inrush current Ipk upon switching on the lamp is around ten times greater than the stabilized current Istab during normal operation.

As a result, the power supply module PLT1 must be capable of providing a current at least equal to the inrush current Ipk without being damaged. This is highly constrictive as to the technology used and in terms of the size of the components. Specifically, the power supply module PLT1 customarily includes a power transistor that has to be dimensioned to transmit a very high current, and that is consequently large in size.

One solution making it possible to reduce the size of the components of the power supply module PLT1 consists in supplying power to the incandescent lamp using a pulse width modulation (PWM) technique. In the PWM technique, the current is transmitted by peaks of short duration, making it possible to provide the power necessary for the on/off switch-on phase without impairing a power supply module PLT1, the power transistor of which, for example, is however dimensioned to provide a lower current, of the order of the stabilized current Istab.

Moreover, LED lighting devices, such as three-color lights LEDRGB (shown for example in FIG. 2B), are typically produced on a printed circuit board MLED, allowing the lighting to be managed. This kind of printed circuit board includes, for example, a bus interface INT, a local microcontroller CMDL and a three-color light-emitting diode LEDRGB.

Such LED lighting devices or 'LED blocks' MLED generally have a residual current consumption when switched off, stemming for example from the consumption of the microcontroller CMDL in standby mode. This is detrimental in particular for devices that are battery-operated, such as in automotive equipment.

Figure 2A:
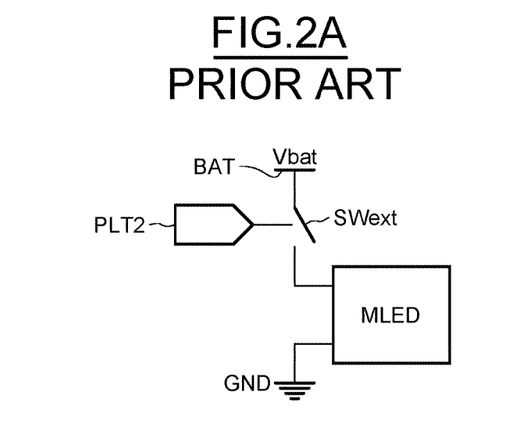
Figure 2B:
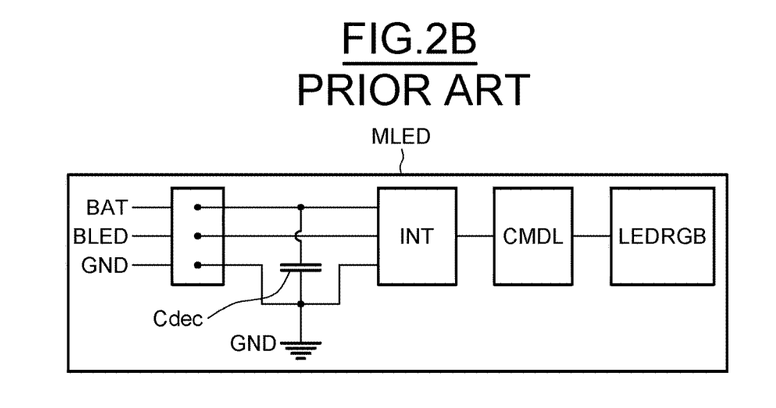

FIG. 2A shows one common solution making it possible to reduce electricity consumption when the block MLED is not being used. When switched off, the power supply Vbat is disconnected from the printed circuit board MLED by virtue of an external on/off switch SWext commanded by a power supply module PLT2.

However, upon closure of the on/off switch SWext, a current peak is imposed by a decoupling capacitor Cdec as the latter is charged to the supply voltage Vbat.

As a result, the on/off switch SWext must also be dimensioned so as to deliver such an inrush current, which is far higher than the operating current in the stable regime. This also leads to an excessive bulk, on the one hand through the size of the on/off switch and on the other hand through the 'external' aspect of the component, outside of an integrated circuit.

PWM techniques are not compatible with this kind of printed circuit board, as the logic circuits of the microcontrollers CMDL and of the bus interface INT receive said PWM pulses as a multitude of reset signals and can cause the system to block.

As a result, a power supply device capable of supplying power both to an incandescent lamp LMP and to a block MLED currently has to be dimensioned to allow the higher inrush current of those drawn by the two kinds of lighting device structure to flow, or include a PWM power supply device that is also able to command an external on/off switch that is dimensioned to allow the inrush current drawn by a block MLED to flow.

In both cases, the bulk of the power supply device is non-negligible. It would therefore be desirable to produce an integrated power supply device (that is to say without any external component) that has little bulk, for example by being dimensioned to allow a low stable regime current to flow.

SUMMARY

To this end, what is proposed is a power supply device comprising a supply transistor, the control electrode of which is configured to receive a command signal and the conduction electrodes of which are respectively coupled to a supply terminal configured to receive a supply voltage and to an output terminal configured to provide electric power to at least one lighting module having an incandescent lamp structure or a light-emitting diode structure. The power supply device also includes a driving means configured to selectively generate, depending on an instruction signal representative of the structure of said at least one lighting module, a first command signal able to command the supply transistor into an ohmic regime, a second command signal able to command the supply transistor into a pulse width modulation regime involving an alternation of ohmic regimes and blocked regimes, and a third command signal able to command the supply transistor into a saturated regime.

In other words, what is proposed is a power supply device that can be reconfigured in accordance with modes that are adapted for a lamp structure or for an LED block structure. In one configuration (supply transistor in a pulse width modulation regime), a PWM signal is for example used to on/off switch on an incandescent lamp, and in a second configuration (supply transistor in a saturated regime), a set current source is used for example to charge the decoupling capacitor of a light-emitting diode structure. Furthermore, the supply transistor is advantageously optimally dimensioned so as to allow, in the ohmic regime, a current corresponding to the stabilized regime of an incandescent lamp to flow.

The proposed lighting system thus makes it possible to produce a power supply device in an integrated and optimized manner, in particular with regard to bulk and with regard to functions.

The driving means is advantageously configured, depending on the instruction signal, to generate the second command signal or the third command signal over the course of a startup phase of the power supply device, and then the first command signal over the course of a steady-state phase following the startup phase.

The driving means is advantageously configured to generate the second command signal if the instruction signal is representative of an incandescent lamp structure of said at least one lighting module, and to generate the third command signal if the instruction signal is representative of a light-emitting diode structure of said at least one lighting module, over the course of said startup phase of the power supply device.

According to one embodiment, the driving means is configured, depending on said instruction signal, to determine parameters of the startup phase, said parameters comprising the duration of the startup phase, the sampling frequency of the pulse width modulation and the magnitude of the saturation current in the saturated regime of the supply transistor.

For example, various values for said parameters of the startup phase may be obtained with the aid of tables, for example contained in registers.

According to one embodiment, the driving means includes a first diode and a second diode that are coupled on the one hand to the source of the supply transistor and on the other hand to a switch configured to couple the gate of the supply transistor to the first diode in a first position, or to the second diode in a second position, the first diode being configured, when a current passes through it, to generate a first voltage between the gate and the source of the supply transistor, putting the supply transistor into the ohmic regime, the second diode being configured, when a current passes through it, to generate a second voltage between the gate and the source of the supply transistor, putting the supply transistor into the saturated regime.

The driving means may include a first on/off switch and a second on/off switch that are commanded jointly into a first position, allowing a current to flow in the switch, or into a second position, imposing a zero voltage between the gate and the source of the supply transistor, putting it into a blocked state.

The driving means may include an input interface configured to receive said instruction signal and to command the positions of the first on/off switch, of the second on/off switch and of the switch, depending on the instruction signal.

The driving means may be configured to generate the first command signal by putting the first and second on/off switches into their first position and by putting the switch into its first position.

The driving means may be configured to generate the second command signal by alternately putting the first and second on/off switches into their first position and into their second position at what is termed a sampling frequency of the pulse width modulation, and by putting the switch into its first position.

The driving means may be configured to generate the third command signal by putting the first and second on/off switches into their first position and by putting the switch into its second position.

The driving means may include an internal power supply stage comprising a current generator and a switch-mode voltage generator configured to generate a voltage at least equal to the supply voltage plus the threshold voltage of the first diode.

According to one embodiment, said diodes are Zener diodes, the anodes of which are linked to the source of the supply transistor.

Also proposed is a lighting system comprising a power supply device such as defined above and at least one lighting module having an incandescent lamp structure or a light-emitting diode structure, which module is coupled to the output of the power supply device.

The lighting system may furthermore include a control means, such as an on-board vehicle computer, configured to generate the instruction signal, and a power supply means, such as a vehicle battery, configured to provide said supply voltage.

A vehicle, such as a motor vehicle, may advantageously include a system such as defined above.

BRIEF DESCRIPTION OF THE DRAWINGS

Other advantages and features of the invention will become apparent on examining the detailed description of wholly non-limiting embodiments and modes of implementation, and the appended drawings in which.

DETAILED DESCRIPTION

Figure 3:
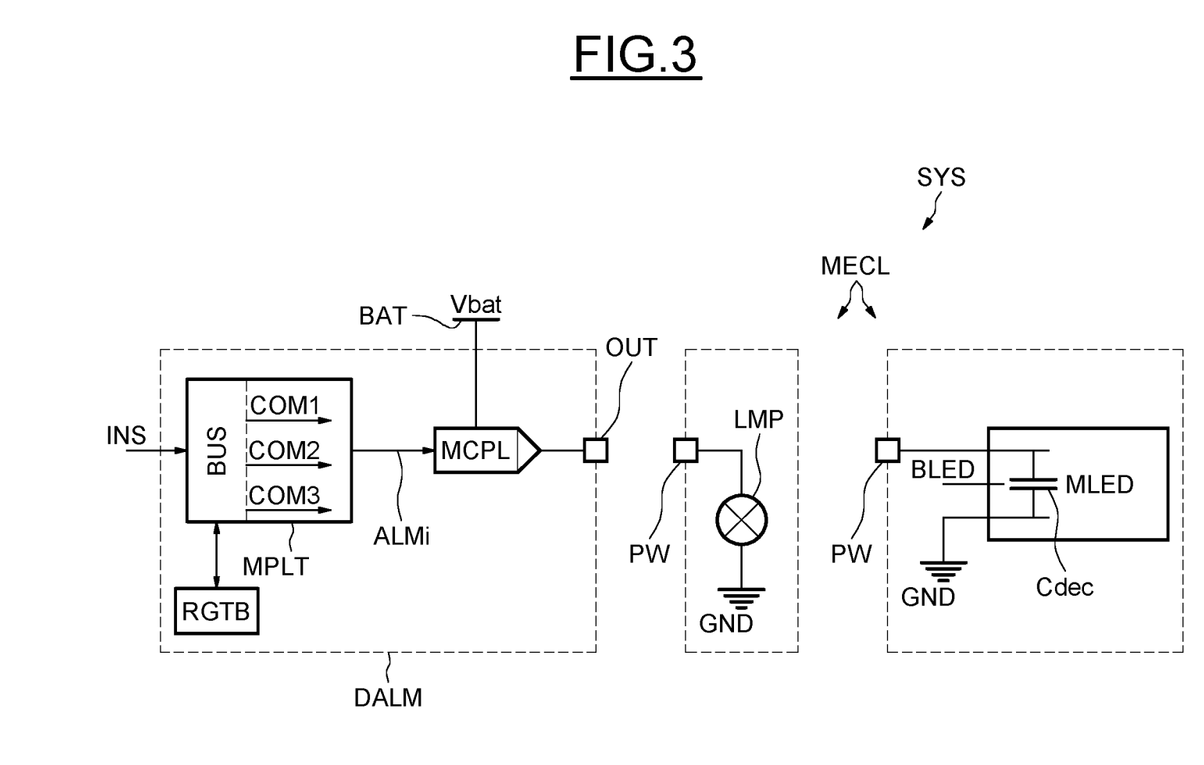
FIG. 3 shows a lighting system.

FIG. 3 shows a lighting system SYS including two lighting modules MECL having different structures, and a power supply device DALM capable of supplying power to one or the other of said lighting modules MECL.

A first lighting module has a conventional incandescent lamp structure LMP, connected on the one hand to a ground terminal GND and on the other hand to a terminal PW configured to receive electric power enabling light to be generated.

The second lighting module, for its part, has a light-emitting diode block structure MLED, the block including lighting management means, for example on a printed circuit board of the kind described in relation to FIG. 2B. The second lighting module thus includes, for example, a supply terminal PW, a ground terminal GND and a control bus terminal BLED.

The commands delivered on the bus terminal BLED make it possible, for example, to manage the lighting mode by means, for example, of a bus interface and of a local microcontroller.

A decoupling capacitor Cdec is arranged, in a conventional manner, between the supply terminal and the ground terminal GND. The decoupling capacitor Cdec generally has a capacitance of the order of 1 microfarad.

The power supply device includes a coupling circuit MCPL making it possible to couple an output terminal OUT, configured to deliver electric power to the lighting modules MECL from a supply voltage Vbat and in accordance with power supply modes adapted to each structure of said lighting modules MECL.

A driving circuit MPLT generates power supply command signals ALMi, commanding the coupling circuit MCPL into various power supply modes.

The driving circuit MPLT is configured to receive an instruction signal INS, for example by means of an $I^2C$ or SPI bus interface BUS. The instruction signal INS makes it possible to communicate an order to on/off switch on or to on/off switch off said lighting modules. The instruction signal INS may also be representative of the structure of the lighting module MECL to be supplied with power.

The interface BUS generates signals COM1-COM3, depending on the instruction signal INS, making it possible to command an analog generator that is included in the driving circuit MPLT and configured to generate the power supply command ALMi in accordance with various power supply modes.

The exemplary power supply device DALM described in relation to FIG. 3 is of the high-side kind, that is to say that the coupling circuit MCPL makes it possible to link, on request, the supply voltage terminal BAT to the lighting modules MECL that are linked, on their part, to the reference voltage terminal GND.

That being said, the principle behind the creation and the operation of this example applies perfectly to a low-side power supply device, that is to say the coupling circuit (MCPL) of which makes it possible to link, on request, the reference voltage terminal GND to the lighting modules MECL that are linked, on their part, to the supply voltage terminal BAT.

Figure 4:
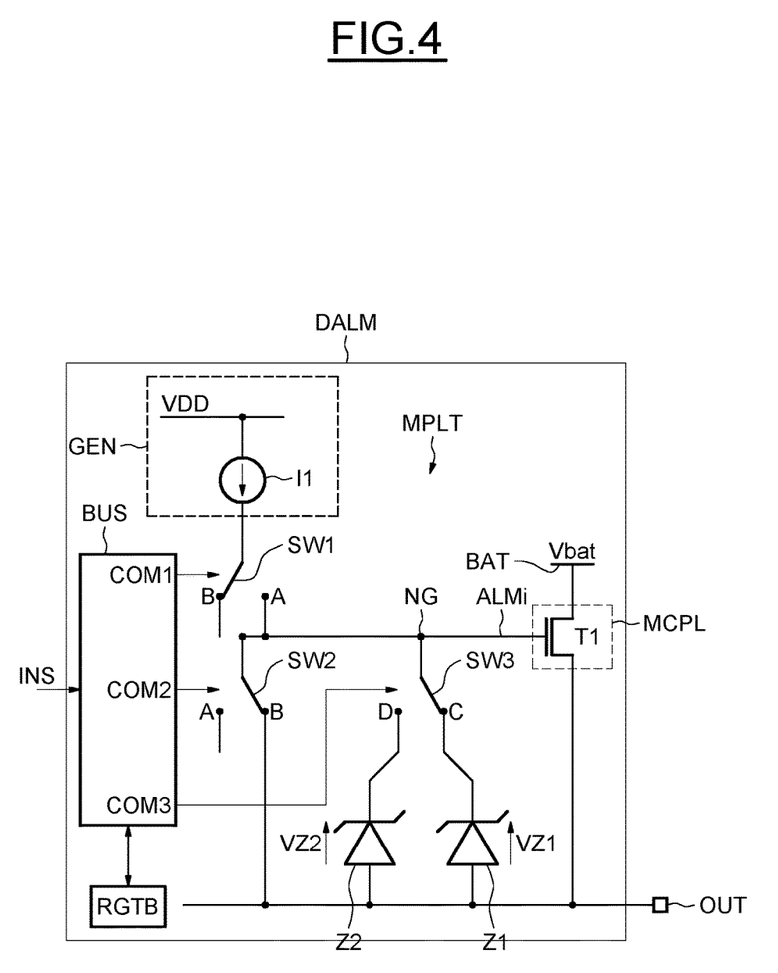
FIG. 4 shows an exemplary embodiment of an analog generator.

FIG. 4 shows an exemplary embodiment in particular of such an analog generator belonging to the driving circuit MPLT of the power supply device DALM.

This embodiment is suitable in particular for a coupling circuit MCPL including a supply transistor Ti connected at its drain to a supply voltage source BAT, at its source to the output terminal OUT, and at its gate to a gate node NG to which a variety of power supply command signals ALMi are applied.

More precisely, it is the voltage between the gate and the source (gate-source voltage) of the supply transistor T1 that will command it into an ohmic regime, a blocked regime or a saturated regime.

In this example, a first diode Z1 and a second diode Z2 are coupled on the one hand to the source of the supply transistor T1 and on the other hand to a switch SW3, commanded by a signal COM3 issued from the bus interface BUS.

The switch SW3 is configured to couple the gate of the supply transistor T1 to the first diode Z1 in a first position C, and the second diode Z2 in a second position D.

The diode Z1 has a threshold voltage VZ1 such that, when this threshold voltage is reached, the supply transistor T1 is put into an ohmic regime, by this threshold voltage VZ1 impacting on the gate-source voltage of the supply transistor T1.

The diode Z2, for its part, has a threshold voltage VZ2 such that, when this threshold voltage is reached, the supply transistor T1 is put into a saturated regime, delivering a constant saturation current (Idssat).

In this example, the diodes Z1, Z2 are Zener diodes, the respective anodes of which are coupled to the source of the supply transistor T1, and the previously introduced threshold voltages VZ1, VZ2 are the reverse threshold voltages (or Zener voltages) of said Zener diodes Z1, Z2.

That being said, other configurations making it possible to set the gate-source voltage of the supply transistor may be envisaged, such as current mirrors or junction diodes.

Moreover, the power supply device DALM includes an internal power supply stage GEN, able to generate an internal voltage VDD sufficient to unblock said diodes Z1, Z2, that is to say an internal voltage VDD at least equal to the supply voltage Vbat plus the highest threshold voltage VZ1 or VZ2 of said first or second diodes Z1, Z2.

For example, the internal power supply stage GEN may include a switch-mode voltage generator generating said internal voltage VDD from the supply voltage Vbat.

Furthermore, a current I1 generator makes it possible to regulate the current flowing in one of the forward-biased diodes Z1, Z2 to a reasonable magnitude.

The driving circuit MPLT also includes a first on/off switch SW1 and a second on/off switch SW2 that are commanded by the signals COM1 and COM2 that are issued from the bus interface BUS, respectively.

The signals COM1, COM2 are transmitted jointly in order to put said first and second on/off switches SW1, SW2 into a first position AA allowing a current I1 to flow in the switch SW3, or into a second position BB coupling the gate node NG to the source of the supply transistor T1, imposing a zero voltage between the gate and the source of the supply transistor T1, thus putting it into a blocked state.

Thus, in this example, the driving circuit MPLT is configured to generate the first command signal ALM1 (commanding the supply transistor T1 into an ohmic regime) by putting the first and second on/off switches SW1, SW2 into their first position AA and by putting the switch SW3 into its first position C.

Specifically, the voltage VDD is sufficient to forward-bias the diode Z1, and thus a set voltage VZ1 is generated between the gate and the source of the supply transistor T1 and puts it into an ohmic regime.

Advantageously, the supply transistor T1 and the first diode Z1 are dimensioned so as to be optimized to supply power to a load corresponding to an incandescent lamp LMP in the stable regime (the consumption of a lamp in the stable regime generally being greater than the consumption of an LED block in the stable regime).

The driving circuit MPLT is also configured to generate the second command signal ALM2 (commanding the supply transistor T1 into a pulse width modulation regime) by alternately putting the first and second on/off switches SW1, SW2 into their first position AA and into their second position BB, and by putting the switch SW3 into its first position C.

As a result, the transistor T1 is put alternately into the ohmic regime (position AA) and into the blocked regime (position BB), making it possible to supply power to an incandescent lamp, for example, using a pulse width modulation PWM technique.

The alternation of the joint positions AA and BB of said on/off switches SW1, SW2 is implemented in accordance with conventional PWM technique parameters that are chosen so as to be optimal, in particular for the incandescent lamp lighting module LMP, depending on the supply transistor T1. Said parameters are for example the sampling frequency $f_{PWM}$ of the pulse width modulation and the duration $t_{PWM}$ of the implementation of the pulse width modulation regime.

For example, the frequency $f_{PWM}$ is chosen such that the duration for which the on/off switches SW1, SW2 are kept in position AA is sufficiently short that the current peak passing through the supply transistor T1 over this duration does not destroy it.

The driving circuit MPLT is configured to generate the third command signal ALM3 (commanding the supply transistor into a saturated regime) by putting the first and second on/off switches SW1, SW2 into their first position AA, and by putting the switch SW3 into its second position D.

The voltage VDD is thus sufficient to forward-bias the diode Z2, and thus a set voltage VZ2 is generated between the gate and the source of the supply transistor T1 and puts it into a saturated regime.

Although not shown in FIG. 3, it is also possible for other second diodes having different threshold voltages to be coupled to the switch SW3, in as many other positions of the switch SW3.

In this case, the positions of the switch SW3 other than the first position D make it possible to choose a gate-source voltage that puts the supply transistor T1 into a desired saturated regime. This makes it possible to be able to choose the value of the set current in the saturated regime Idssat applied on the output terminal OUT, in order for example to adapt one and the same power supply device DALM to various LED blocks having different restrictions.

Moreover, in this example, reverse-biased Zener diodes Z1, Z2 make it possible to set the gate-source voltage of the supply transistor T1 to a given value. That being said, this function may also be achieved by creating, for example, an assembly of simple resistors, or an assembly of forward-biased diodes, or combinations of elementary components such as diodes, resistors, transistors, etc.

Figure 5:
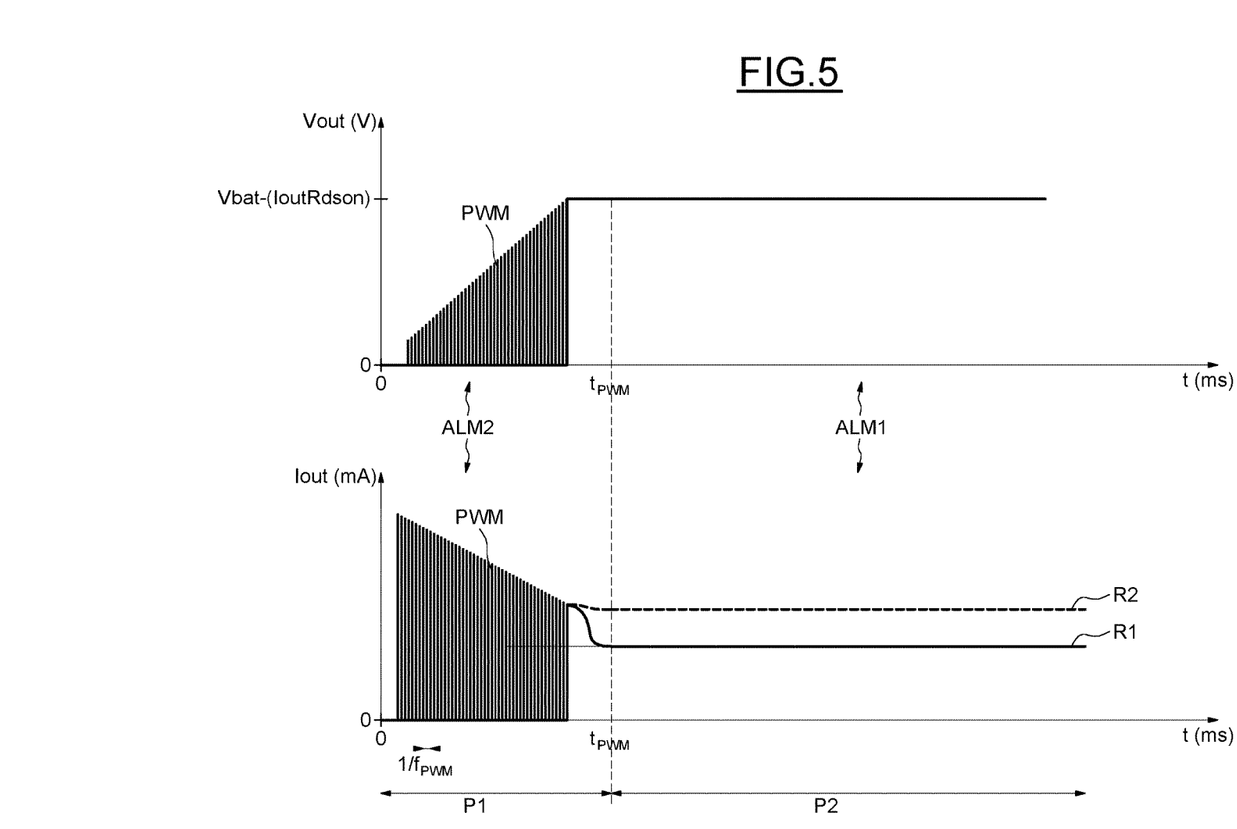
FIGS. 5 and 6 show two power supply modes corresponding to an incandescent lamp LMP power supply and to an LED block power supply.
Figure 6:
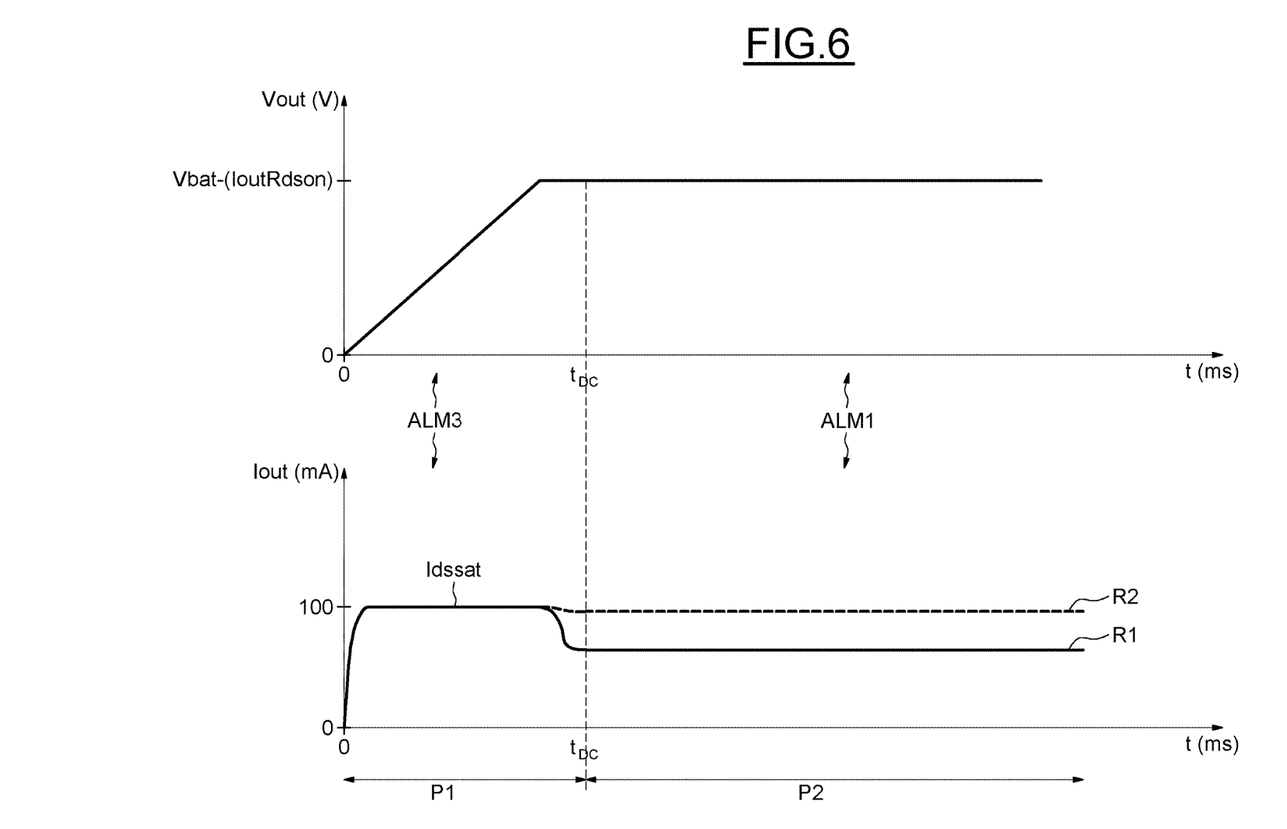

FIGS. 5 and 6 show two power supply modes corresponding to an incandescent lamp LMP power supply and to an LED block power supply, respectively, implemented by the power supply device DALM.

When the instruction signal INS orders a lighting module having an incandescent lamp structure to be switched on, the driving circuit MPLT generates the second command signal ALM2 over the course of a startup phase of the power supply device P1, for a duration $t_{PWM}$. The second command signal ALM2 puts the supply transistor T1 into an alternation of ohmic regimes and blocked regimes, generating pulse width modulation PWM pulses on the output node OUT.

The sampling frequency of these pulses $f_{PWM}$ and the duration $t_{PWM}$ of the first phase P1 may be commanded by the instruction signal INS, depending on the structure of the incandescent lamp supplied with power.

For example, a table contained in a register RGTB of the power supply device DALM may make it possible to translate a command from the instruction signal INS into an analog command adapted to the architecture of the device DALM.

During what is termed a steady-state phase P2 following the startup phase P1, the driving circuit MPLT then generates the first command signal ALM1 for as long as the lamp needs to be switched on.

The first command signal ALM1 puts the supply transistor into an ohmic regime, allowing a current Tout to flow in the lamp. In the ohmic regime, the current Tout depends on the load R1-R2 connected to the output node OUT, in accordance with equation (eq1): Iout*(Ri+Rdson)=Vbat; where Ri is the load connected to the terminal OUT, Rdson is the resistance of the ohmic regime of the supply transistor T1, and Vbat is the supply voltage provided on the terminal BAT.

The supply transistor T1 is dimensioned such that Rdson satisfies equation (eq1) for Iout=Istab, Istab being the current necessary for the lamp to operate correctly in the stable regime.

When the instruction signal INS orders a lighting module having a light-emitting diode block structure to be switched on, the driving circuit MPLT generates the third command signal ALM3 over the course of a startup phase P1 of the power supply device, for a duration tsat. The third command signal ALM3 puts the supply transistor T1 into a saturated regime, limiting the current Tout on the output node OUT to a set saturation current value Idssat.

With the current Tout being restricted to a maximum value Idssat, the decoupling capacitor Cdec present on the supply terminal of the LED block thus charges monotonically and linearly, as shown by the curve of the voltage Vout on the output terminal OUT during the startup phase P1.

The value of this saturation current Idssat and the duration tsat of the first phase P1 may be commanded by the instruction signal INS, depending on the structure of the LED module, and in particular depending on the capacitance of the decoupling capacitor Cdec (generally of the order of 1 microfarad).

For example, a table contained in a register RGTB of the power supply device DALM may make it possible to translate a command from the instruction signal INS into an analog command adapted to the architecture of the device DALM.

Next, during a steady-state phase P2 following the startup phase P1, the driving circuit MPLT then generates the first command signal ALM1 for as long as the lamp needs to be switched on.

The first command signal ALM1 puts the supply transistor into an ohmic regime, allowing the current necessary to supply power to the LED block to flow, this current generally being lower than the current Istab consumed by an incandescent lamp in the stable regime.

Figure 7:
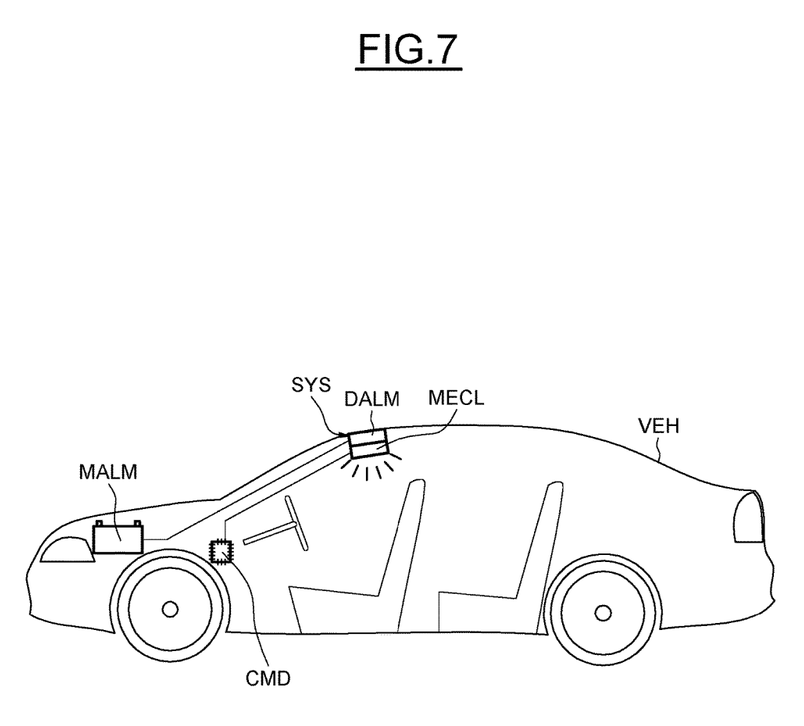
FIG. 7 shows an example of an application of the system within a vehicle.

FIG. 7 shows an example of an application, within a vehicle VEH, of a system SYS such as described previously in relation to FIGS. 3 to 6, furthermore including a control circuit CMD configured to generate the instruction signal INS, and a power supply circuit MALM configured to provide said supply voltage Vbat.

In this kind of application, for example in a motor vehicle, the power supply circuit MALM is generally a 12 V-45 Ah battery.

The control circuit CMD may be, for example, a microcontroller dedicated to the use of the vehicle passenger compartment lights and/or the vehicle headlights. More generally, the control circuit CMD is included in a 'smart' element of the vehicle, generally referred to as an 'on-board computer'.

The control circuit CMD is thus configured to transmit an instruction signal INS to such a power supply device DALM such that it generates a supply of power that is optimized for each structure of the various lighting modules MECL of the vehicle VEH.

The instruction signal is for example communicated on an I²C bus or on an SPI bus, transmitting standard commands or commands that are encoded specifically for the power supply device DALM described previously in relation to FIGS. 3 to 6.

Moreover, the invention is not limited to these embodiments, but incorporates all variants thereof; for example, the structure of the LED block, other than the decoupling capacitor Cdec, has been given by way of example. The embodiment of the power supply device described in relation to FIG. 4 may also support various variants and additions that are useful to the hardware implementation.

The invention claimed is:

1. A power supply device, comprising:
a supply transistor coupled to drive a load circuit comprising a lighting module; and
a driving circuit configured to drive a control terminal of the supply transistor in a plurality of operating modes depending on a structure of the load circuit, said operating modes including: a first operating mode where a control signal applied to the control terminal is generated so that the supply transistor operates in an ohmic regime when driving the load circuit and a second operating mode where the control signal applied to the control terminal is generated so that the supply transistor operates in a saturated regime when driving the load circuit; and
wherein if the lighting module includes an incandescent light source then the driving circuit drives the control terminal of the supply transistor in the first operating mode, and wherein if the lighting module includes a light emitting diode light source then the driving circuit drives the control terminal of the supply transistor in the second operating mode.

2. The power supply device according to claim 1, wherein the control signal is generated in response to a configuration signal which is indicative of the structure of the load circuit.

3. The power supply device according to claim 1, wherein the driving circuit comprises:
a first voltage circuit configured to apply a first gate to source voltage to the supply transistor in the first operating mode, wherein the first gate to source voltage configures the supply transistor to operate in the ohmic regime; and
a second voltage circuit configured to apply a second gate to source voltage to the supply transistor in the second operating mode, wherein the second gate to source voltage configures the supply transistor to operate in the saturated regime.

4. The power supply device according to claim 3, wherein the first voltage circuit is a first zener diode having a voltage equal to the first gate to source voltage, and wherein the second voltage circuit is a second zener diode having a voltage equal to the second gate to source voltage.

5. The power supply device according to claim 3, wherein the driving circuit further comprises a switching circuit configured to selectively connect one of the first and second voltage circuits to the supply transistor.

6. The power supply device according to claim 1, wherein said plurality of operating modes further include a third operating mode where the control signal applied to the control terminal is generated with a pulse width modulation involving an alternation of a selected one of the ohmic and saturated regimes and a blocked regime.

7. The power supply device according to claim 6, wherein the third operating mode is implemented during a start-up time period and one of the first and second operating modes is implemented during a steady state time period following the start-up time period.

8. The power supply device according to claim 1, wherein the second operating mode is implemented during a start-up time period and the first operating mode is implemented during a steady state time period following the start-up time period.

9. The power supply device according to claim 1, wherein the driving circuit further includes an internal power supply stage comprising a current generator coupled to supply current to the control terminal of the supply transistor from a supply voltage.

10. A method for providing electric power to at least one lighting module having a structure corresponding to one of an incandescent lamp structure or a light-emitting diode structure, comprising:
receiving an instruction signal which indicates the structure of said at least one lighting module; and
if the instruction signal indicates that the structure is the incandescent lamp structure, then controlling an operational mode of a supply transistor configured to deliver the electric power to the at least one lighting module so that the supply transistor operates in an ohmic regime; and
if the instruction signal indicates that the structure is the light-emitting diode structure, then controlling the operational mode of the supply transistor configured to deliver the electric power to the at least one lighting module so that the supply transistor operates in a saturation regime.

11. The method according to claim 10, further comprising:
applying a first gate to source voltage to the supply transistor in the first operating mode, wherein the first gate to source voltage configures the supply transistor to operate in the ohmic regime; and
applying a second gate to source voltage to the supply transistor in the second operating mode, wherein the second gate to source voltage configures the supply transistor to operate in the saturated regime.

12. The method according to claim 11, wherein the first gate to source voltage is a generated by a first zener diode, and wherein the second gate to source voltage is generated by a second zener diode.

13. The method according to claim 10, further comprising, during a start-up time period, controlling the operational mode of the supply transistor configured to deliver the electric power to the at least one lighting module so that the supply transistor is controlled with a pulse width modulation involving an alternation of a selected one of the ohmic and saturated regimes and a blocked regime.

14. The method according to claim 13, wherein controlling the operational mode of the supply transistor configured to deliver the electric power to the at least one lighting module in either the ohmic regime or saturation regime is implemented during a steady state time period following the start-up time period.

15. The method according to claim 10, further comprising controlling the operational mode of the supply transistor configured to deliver the electric power to the at least one lighting module so that the supply transistor operates in the saturation regime during a start-up time period and then controlling the operational mode of the supply transistor configured to deliver the electric power to the at least one lighting module so that the supply transistor operates in the ohmic regime during a steady state time period following the start-up time period.

16. The method according to claim 10, further comprising:
   if the instruction signal indicates the structure is the incandescent lamp structure, then during a start-up time period first controlling the operational mode of the supply transistor configured to deliver the electric power to the at least one lighting module so that the supply transistor operates in the saturation regime, and then after the end of the start-up time period second controlling the operational mode of the supply transistor configured to deliver the electric power to the at least one lighting module so that the supply transistor operates in the ohmic regime.

\* \* \* \* \*

UNITED STATES PATENT AND TRADEMARK OFFICE
CERTIFICATE OF CORRECTION

PATENT NO.        : 10,492,281 B2
APPLICATION NO.   : 16/285615
DATED             : November 26, 2019
INVENTOR(S)       : Philippe Sirito-Olivier et al.

Page 1 of 1

It is certified that error appears in the above-identified patent and that said Letters Patent is hereby corrected as shown below:

In the Specification

At Column 5, Line 63, please replace the term [[ Ti ]] with -- T1 --.

At Column 8, Line 17, please replace the term [[ Tout ]] with -- Iout --.

At Column 8, Line 18, please replace the term [[ Tout ]] with -- Iout --.

At Column 8, Line 35, please replace the term [[ Tout ]] with -- Iout --.

At Column 8, Line 37, please replace the term [[ Tout ]] with -- Iout --.

Signed and Sealed this
Fourth Day of February, 2020

Andrei Iancu
*Director of the United States Patent and Trademark Office*